Patented June 20, 1944

2,351,939

UNITED STATES PATENT OFFICE 2,351,939

METHOD OF PRODUCING LACTAMS

Otto Drossbach, Heinrich Hopff, and Karl Huttner, Ludwigshafen-on-the-Rhine, Germany; vested in the Alien Property Custodian No Drawing. Application February 13, 1941, Serial No. 378,770. In Germany March 4, 1940

3 Claims. (Cl. 260—239)

The present invention relates to an improved method of producing lactams.

Lactams are usually produced by converting cyclic ketones into their oximes and subjecting the oximes to the Beckmann rearrangement. This last-named operation is difficult to perform when carried out on a large scale, since the rearrangement proceeds with violence and tends to give rise to overheating or even explosions.

We have now found that lactams can be produced in a one-stage process by passing vaporized dicarboxylic acids, the chain length of which allows of the formation of lactams, i. e. which contain at least 4, with preference 6 or more carbon atoms in the molecule together with ammonia and hydrogen at an elevated temperature over catalysts exerting a hydrogenating and dehydrating action. Catalysts of the said kind are those containing the usual hydrogenation catalysts, such as nickel, cobalt and copper as the hydrogenating constituent and the usual dehydration catalysts, such as phosphoric acid or boric acid as the dehydrating constituent. Both constituents are employed in sufficient quantities so that both the hydrogenation and the dehydration will proceed to the desired extent. Generally the constituents, i. e. for example nickel and phosphoric acid, are employed in approximately equivalent quantities, but it is usually of advantage to employ the hydrogenating component in a certain excess over the dehydrating component. Using the dehydrating component, for example phosphoric acid, in excess, would favor the formation of nitriles and amides. It is not advisable to use catalysts exerting an alkaline reaction. The catalysts may be used on carriers, for example on pumice stone or silica gel, or in admixture with inert substances.

Dicarboxylic acids suitable in the present reaction are, for example, glutaric acid, pimelic acid and especially adipic acid. The dicarboxylic acids may also be employed in the form of their anhydrides. The treatment may be carried out, generally speaking, at temperatures between 100 and 350° C.; it is, however, advisable to work at the lowest possible temperature within said range and not to heat over 300° C. Temperatures ranging from 150 to 260° C. have proved most suitable for the purpose.

The process can be carried out under ordinary pressure, but under increased or reduced pressure as well. The time of reaction is adjusted in dependence on the catalyst, the temperature and the acid employed, so that undesired side-reactions which are liable to occur when too short or too long a stay in the catalyst chamber is chosen are avoided as far as ever possible.

In the presence of hydrogen and ammonia dicarboxylic acids are capable of undergoing most different conversions and kinds of decomposition. The number of reaction products imaginable is very large, depending on whether one or both carboxylic groups are reduced or converted into the nitrile group and then reduced, whether carbon dioxide is split off etc. It is therefore surprising that the reaction can be caused to proceed preponderatingly in the desired direction so that the industrially important lactams can be obtained from dicarboxylic acids in one operation.

The following examples serve to illustrate how the present invention may be carried out in practice but the invention is not restricted to these examples. The parts are by weight.

Example 1

100 parts per hour of adipic acid are quickly evaporated and passed together with 155 parts of ammonia and 9 parts of hydrogen at from 200 to 220° C. over 375 parts of a nickel phosphate catalyst obtained by mixing 4.5 kilograms of nickel carbonate, 1.2 kilograms of phosphoric acid, 3 kilograms of water and 30 liters of pea-sized pumice stone, evaporating the mass to dryness while stirring and reducing it with hydrogen at 350° C. The mixture leaving the reaction vessel is cooled and washed with water. ε-Caprolactam is obtained besides some ε-aminocapronitrile and small quantities of diamines. The lactam can be obtained in a pure state by distillation under reduced pressure.

Instead of the above-mentioned catalyst a catalyst may be employed which has been prepared in an analogous manner from 5 kilograms of nickel carbonate, 5 kilograms of cobalt carbonate, 3 kilograms of phosphoric acid and 100 liters of pumice stone, the catalyst having been reduced for 9 hours. By passing at from 210 to 220° C. over each liter of the said catalyst per hour a mixture of 120 liters of hydrogen, 180 liters of ammonia containing in each cubic meter 67 grams of adipic acid vapor, caprolactam is likewise obtained in a good yield besides adipic acid dinitrile.

Example 2

A mixture of 100 liters of ammonia, 50 liters of hydrogen and 23 grams of vaporized adipic acid is passed per hour over 1 liter of the nickel phosphate catalyst referred to in Example 1 at 250° C. When the reaction mixture is cooled solid ε-caprolactam separates out first. On further cooling a liquid reaction product is condensed which separates into oily constituents and water formed in the reaction. The oil is distilled under reduced pressure whereby the caprolactam is separated from any by-products formed, such as aminocapronitrile and hexamethylene imine.

Example 3

80 liters of hydrogen heated to 180° C. are hourly passed through molten glutaric acid heated to the same temperature. The current of hydrogen charged with glutaric acid vapor is united with 40 liters of ammonia per hour, heated to 300° C. This combined gas-vapor current is passed over 1 liter of a nickel phosphate catalyst precipitated on pumice stone which has been heated to 285° C. The mixture leaving the chamber in which the catalytic reaction goes on is cooled and the condensed lemon-yellow oil is distilled in vacuo. δ-Valerolactam is thus obtained in a yield of 55 per cent of the theory. It boils at 108° C. under a pressure of 5 millimeters (mercury gauge) and melts at 40° C.

The said catalyst is prepared by dissolving 22.5 kilograms of secondary ammonium phosphate in 150 liters of hot distilled water and adding 66.7 kilograms of nickel carbonate while stirring. After adding 1000 liters of granular pumice stone (with grains of about 6 millimeters diameter) the mass is dried on the water-bath while stirring intensely. The dried catalyst is reduced with hydrogen at 350° C. for 24 hours.

The catalyst thus obtained is also suitable for use in converting succinic acid in a similar manner as disclosed above into λ-butyrolactam (melting at 25° C. and boiling at 105° C. under a pressure of 5 millimeters (mercury gauge); in order to obtain as complete as possible a conversion of the succinic acid care should be taken that the reaction mixture remains for a sufficient time in the reaction space.

Example 4

A mixture of 20 liters of ammonia and 100 liters of hydrogen which is charged with 4 grams of the vapors of adipic acid and which is heated to 290° C. is passed per hour at 285° C. over 1 liter of a nickel-boric acid-phosphoric acid catalyst.

On cooling the reaction mixture, a clear yellowish oil is condensed which is subjected to distillation under reduced pressure. After removing therefrom slight amounts of water, a fraction consisting of the azeotropic mixture of hexamethyleneimine and water is obtained first, whereupon ε-caprolactam of high purity is distilled over at 120° C. under a pressure of 5 millimeters (mercury gauge); the lactam crystallizes on further cooling and without being further purified has a melting point of 68° C. The yield of hexamethyleneimine amounts to 18 per cent, while that of ε-caprolactam amounts to 45 per cent of the theory.

The said catalyst is prepared by pasting 102 grams of 100 per cent boric acid, 189 grams of 100 per cent phosphoric acid and 665 grams of nickel carbonate with water, mixing the paste with 10 liters of granular pumice stone, drying the mass and treating it with hydrogen at 350° C.

What we claim is:

1. The process of producing lactams which comprises passing a vaporized saturated dicarboxylic acid containing at least 4 carbon atoms in the molecule, together with ammonia and hydrogen at an elevated temperature over a catalyst containing a hydrogenating constituent of the group consisting of nickel, cobalt, and copper and a dehydrating constituent of the group consisting of phosphate and borate, the catalyst component exerting the hydrogenating action being in molecular excess over the component exerting the dehydrating action.

2. The process of producing lactams which comprises passing a vaporized saturated dicarboxylic acid containing at least 4 carbon atoms in the molecule, together with ammonia and hydrogen at a temperature between 100 and 350° C. over a catalyst containing a hydrogenating constituent of the group consisting of nickel, cobalt, and copper and a dehydrating constituent of the group consisting of phosphate and borate, the catalyst component exerting the hydrogenating action being in molecular excess over the component exerting the dehydrating action.

3. The process of producing lactams which comprises passing a vaporized saturated dicarboxylic acid containing at least 4 carbon atoms in the molecule, together with ammonia and hydrogen at a temperature between 100 and 350° C. over a catalyst containing a hydrogenating constituent of the group consisting of nickel, cobalt, and copper and a dehydrating constituent of the group consisting of phosphate and borate, the catalyst component exerting the hydrogenating action being in molecular excess over the component exerting the dehydrating action and removing lactam from the resultant product.

OTTO DROSSBACH.
HEINRICH HOPFF.
KARL HUTTNER.

Certificate of Correction

Patent No. 2,351,939.  June 20, 1944.

OTTO DROSSBACH ET AL.

It is hereby certified that error appears in the printed specification of the above numbered patent requiring correction as follows: Page 2, first column, line 37, for "λ-butylrolactam" read γ-*butylrolactam*; and that the said Letters Patent should be read with this correction therein that the same may conform to the record of the case in the Patent Office.

Signed and sealed this 22nd day of August, A. D. 1944.

[SEAL]

LESLIE FRAZER,
*Acting Commissioner of Patents.*